April 30, 1968     E. BAUDOUX     3,380,188
CONSTRUCTION KIT INCLUDING WALL, ROOF, BEAM AND FLOOR ELEMENTS
Filed Jan. 29, 1965     15 Sheets-Sheet 1
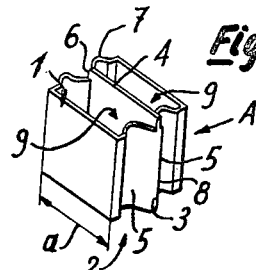
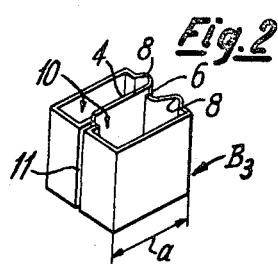
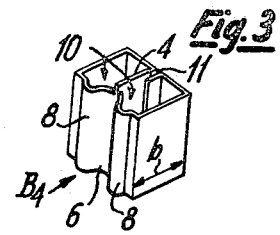
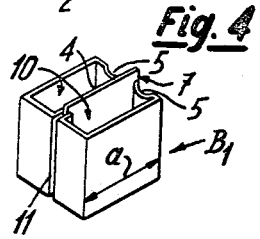
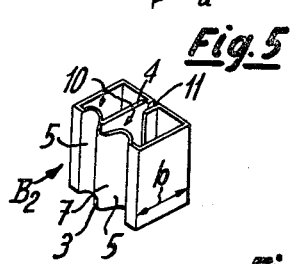
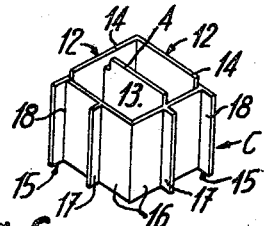
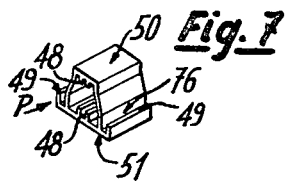
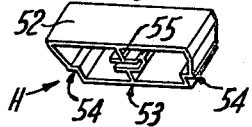
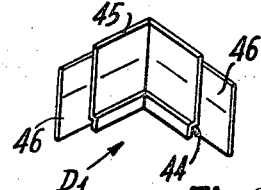
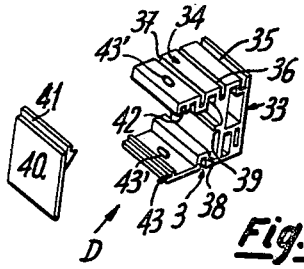
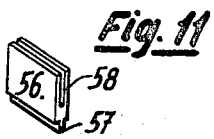
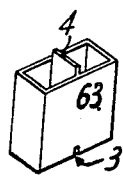
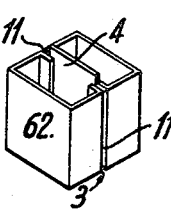
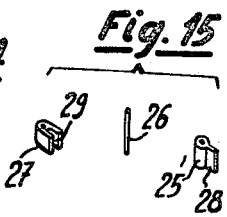

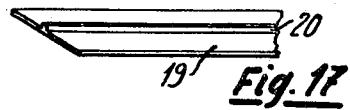
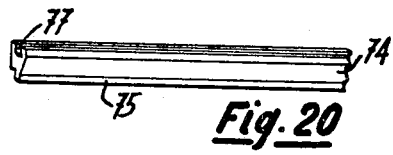
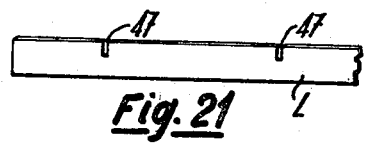
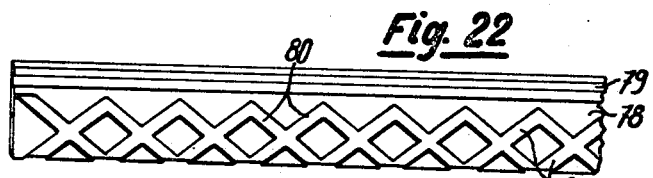
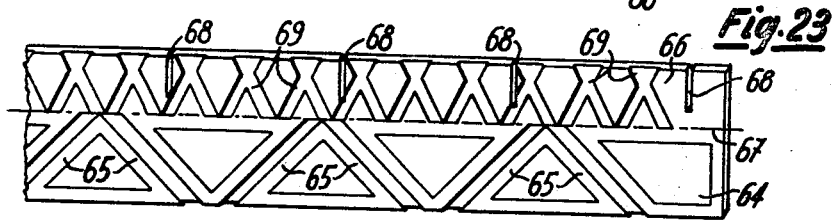
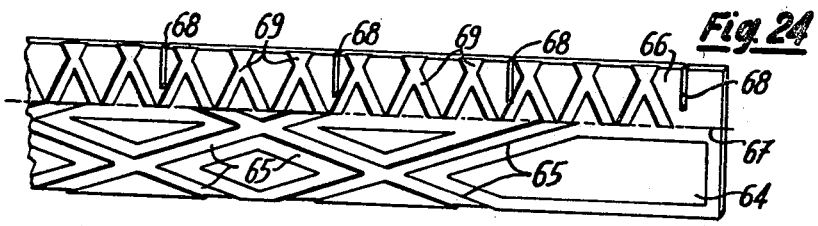

April 30, 1968   E. BAUDOUX   3,380,188
CONSTRUCTION KIT INCLUDING WALL, ROOF, BEAM AND FLOOR ELEMENTS
Filed Jan. 29, 1965   15 Sheets-Sheet 3
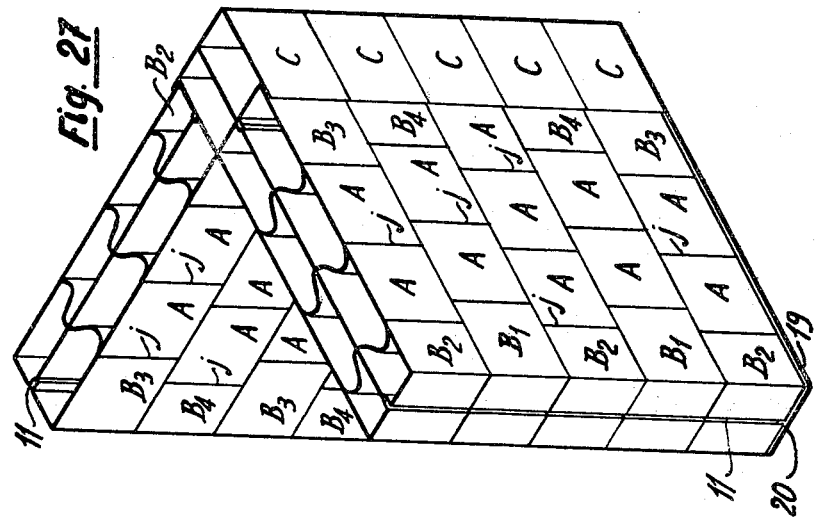
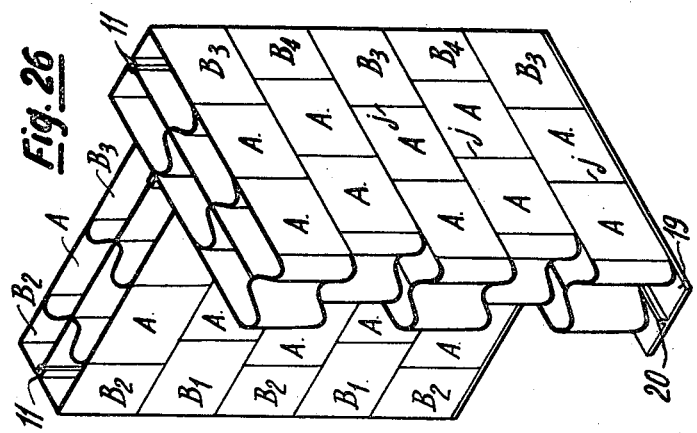
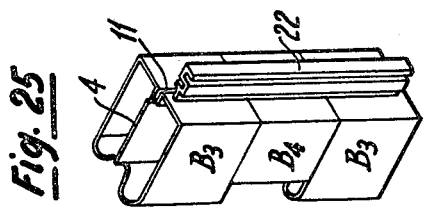

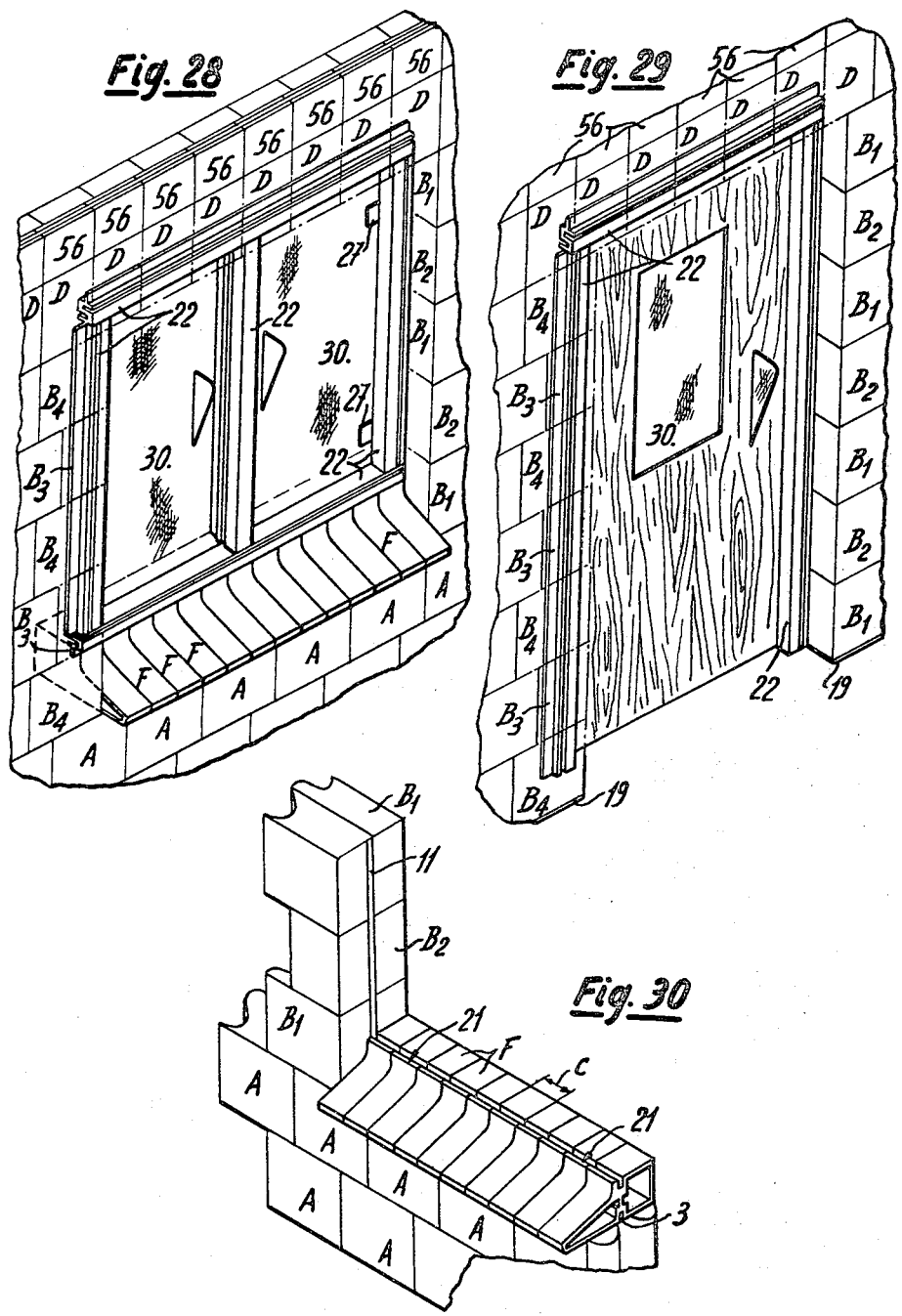

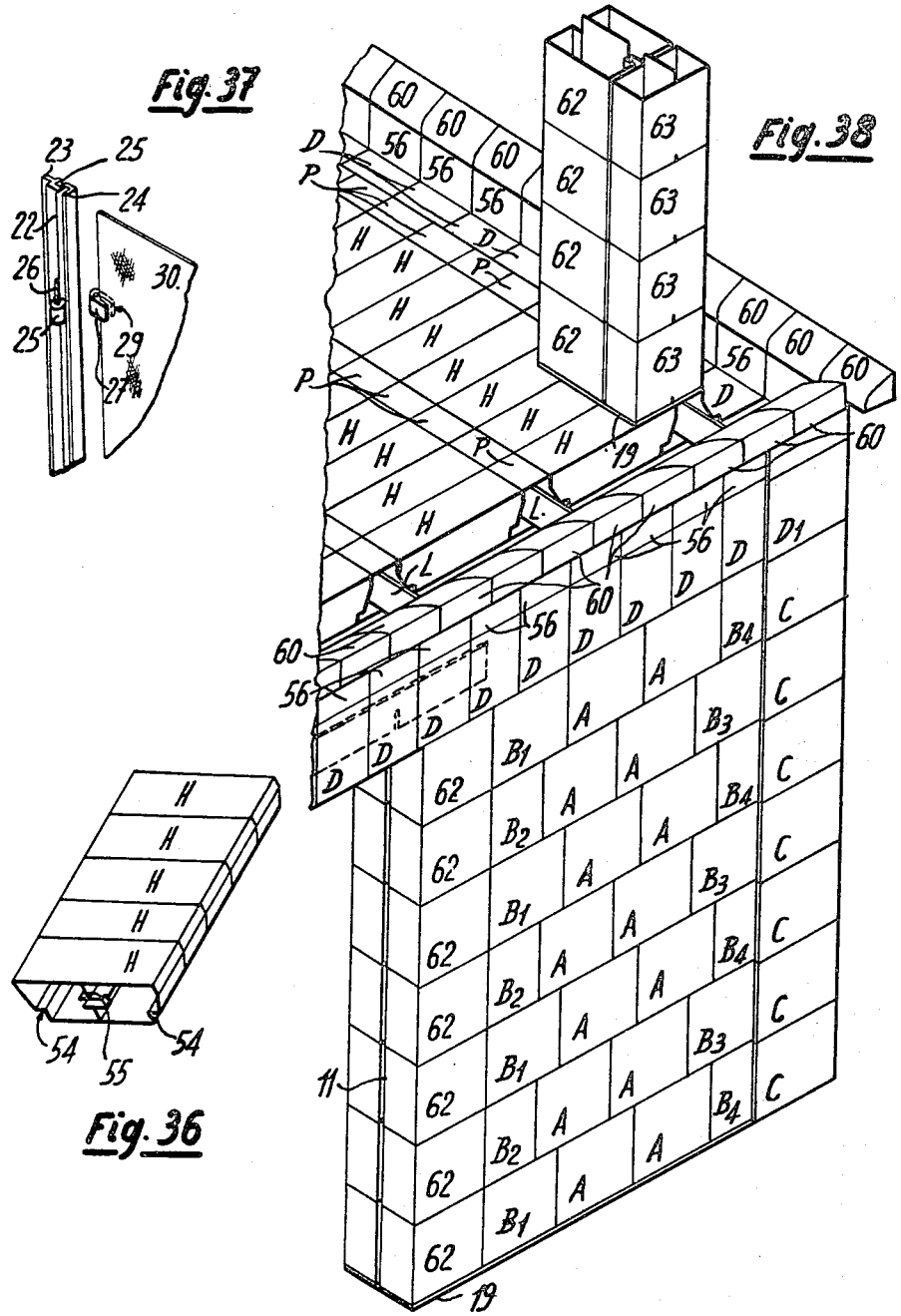

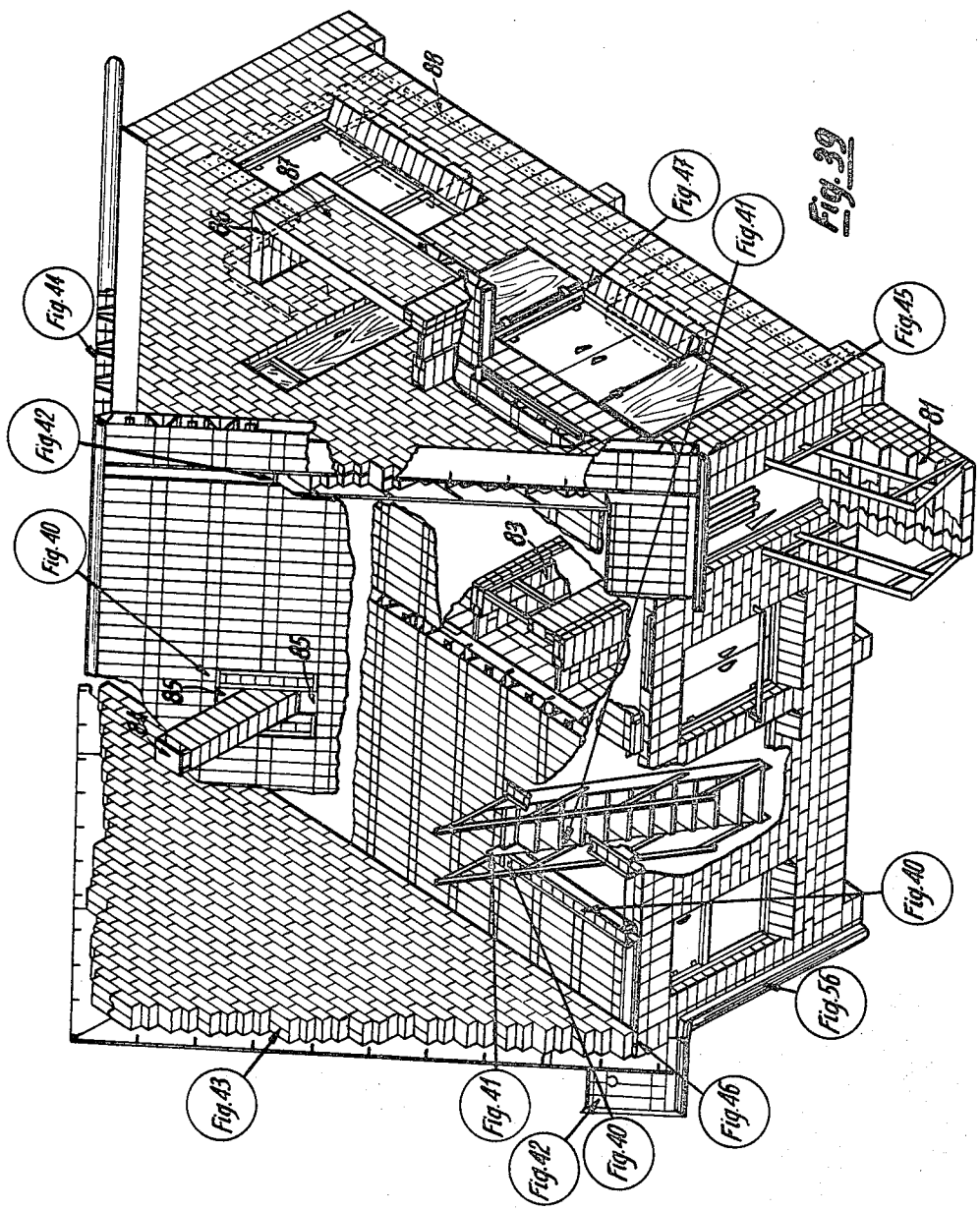

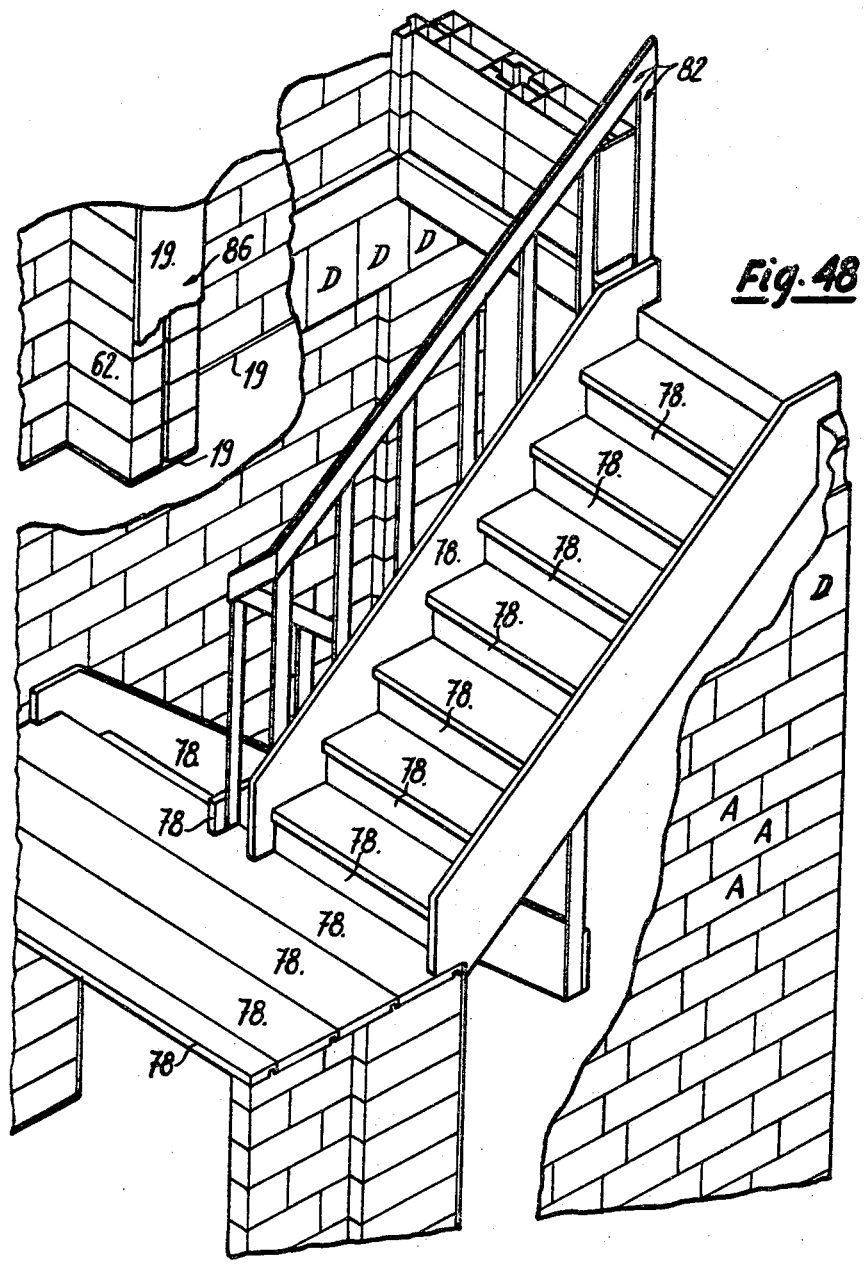

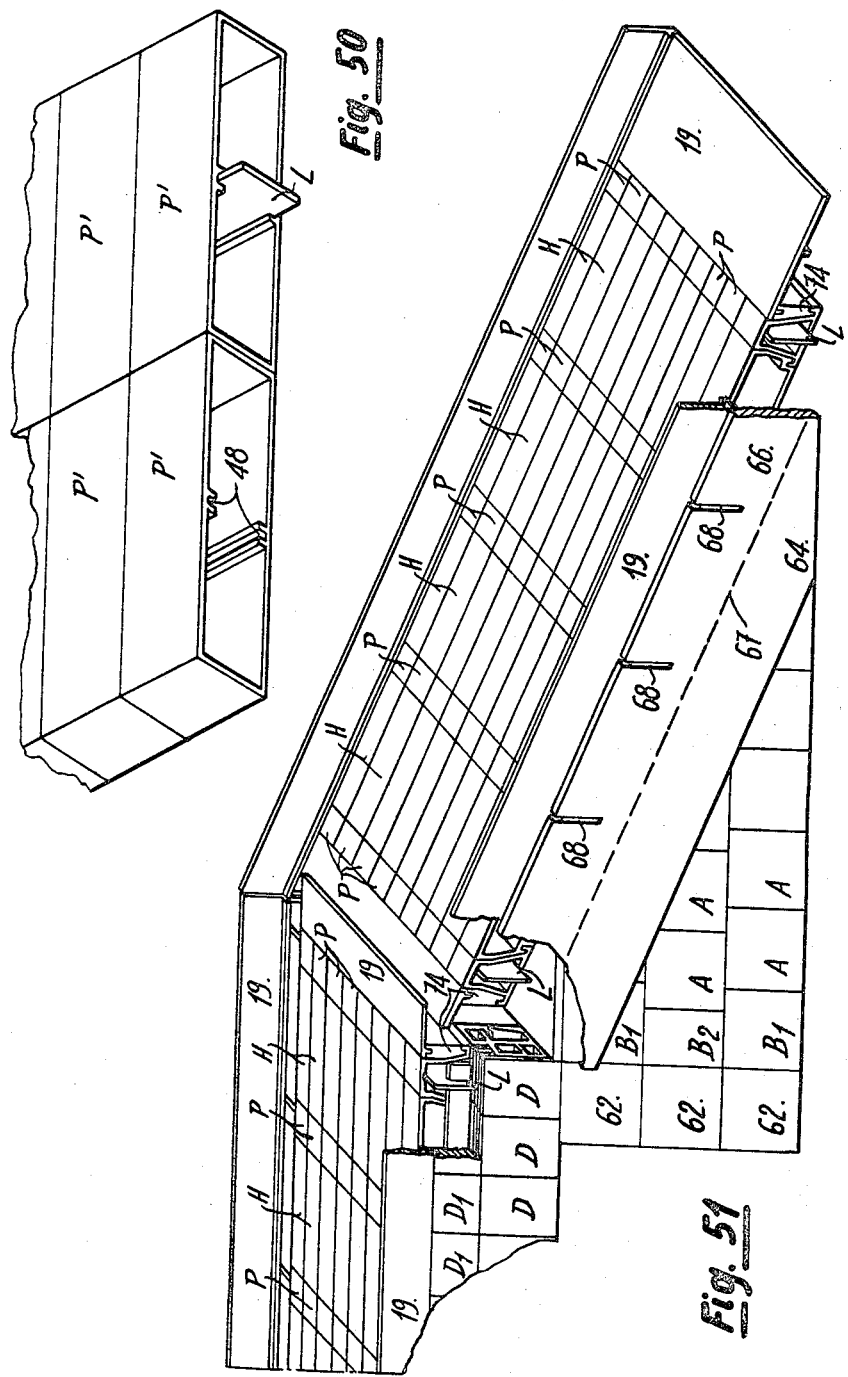

United States Patent Office 3,380,188
Patented Apr. 30, 1968

3,380,188
CONSTRUCTION KIT INCLUDING WALL, ROOF, BEAM AND FLOOR ELEMENTS
Edmond Baudoux, Villepreux, France, assignor to Etablissement Die, Vaduz, Liechtenstein, a corporation of Liechtenstein
Filed Jan. 29, 1965, Ser. No. 428,936
Claims priority, application France, Feb. 12, 1964, 963,470
15 Claims. (Cl. 46—19)

ABSTRACT OF THE DISCLOSURE

A construction toy which includes a plurality of building elements of different shapes and profiles including elements for walls, corners, frames, posts, beams, floors, roofs, stairs and elements for linking and binding the parts together all of which are connectable to each other by means of mating tongues and grooves or in some instances by gluing, so as to permit the construction of toy houses and other types of building structures.

---

Figure 33:
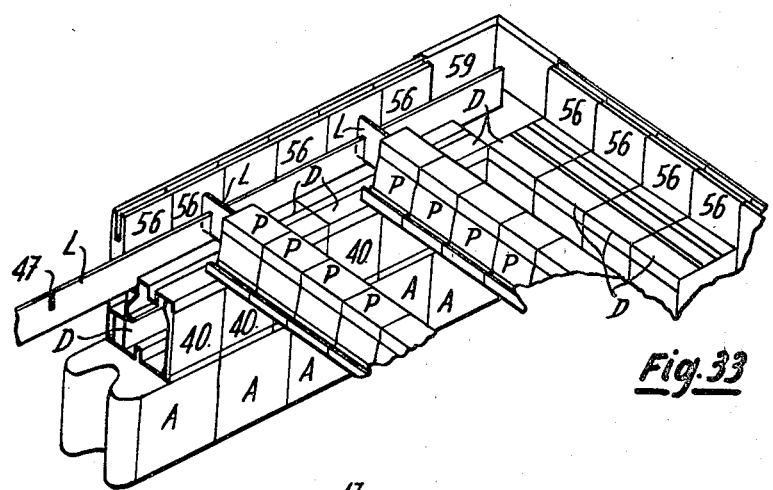

The present invention has for its object a construction toy comprising prefabricated elements constituting diverse structural means which form by juxtaposition and assembling, a construction characterized by the fact that it comprises supports fixed on two opposed construction elements, and linkage elements fixed at their extremities on said supports as well as beam blocks engaged on said linkage elements.

The supports may be formed by the juxtaposition of binding elements which are held together by means of a linkage element and which may be fixed on opposed wall portions.

The supports may also be formed by a section of a framing profile provided with slots in which sections of a female cap are introduced by their edges, these supports adapted to be fixed on gables of opposed walls. These supports may comprise further a part of framing profile including a plurality of slots which are engaged on the free edges of the sections of the female cap.

The beam blocks set on adjacent parallel linkage elements may be joined to form a plane surface.

The bottom blocks may rest on beam blocks set on adjacent parallel linkage elements the resulting structure being arranged to form a plane surface.

The invention also includes wall elements, the end faces of which, are provided with grooves and ribs of corresponding shape, in order to form a male end and a female end. The wall elements may further comprise a thin median partition the upper end of which may merge out of the upper rest face of the element and form an assembling tongue whereas the lower end may comprise a thicker part in which a groove may be made.

The invention includes framing elements, one end of which is provided with grooves and ribs whereas the other end presents a plane face, a vertical slot being provided in said plane end face. These framing elements may comprise a thin median partition provided with a tongue and with a lower groove similar to the wall elements, and the end provided with grooves and ribs of these elements may be either male or female. It may comprise large framing elements the length of which is equal to the one of the wall elements and short framing elements the length of which is equal to the two thirds of the one of the wall elements.

Another component is corner elements which include two dressing faces disposed at right angles, the lateral edges of these dressing faces forming an overlap, the sides opposite said dressing faces including a vertical framing stick intended to engage the vertical slot of the framing elements.

Another component is post elements which present in transverse cross section, a general square shape and have two opposite sides which are provided with a vertical slot similar to the one of the framing elements.

Also included are binding elements provided with a smooth dressing face, an upper surface provided with grooves extending parallel to the dressing face and a slide disposed inside said binding element comprising by a groove and an abutment and intended to receive a linkage element. Each binding element may comprise a removable rear face formed by a plate having at its upper end a tongue intended to enter in a groove provided in the upper surface of the element which opens towards the inside thereof whereas its lower end rests on a resting surface provided in the lower wall of the binding element.

The beam blocks may be hollow and may comprise a slide, intended to receive a linkage element. The slide is formed by two grooves provided in the upper and lower walls of the element and opening towards the inside thereof. The two grooves are disposed in the longitudinal plan of symmetry of the beam block. The beam blocks may present in transverse cross section a general rectangular shape and their width may be equal to two times the length of a wall element. The beam blocks may present in transverse cross section a general trapezoidal shape and have rest surfaces extending on each side of the element, which surfaces are intended to receive the bottom blocks. This resting surface may be separated from the body of the element by means of a longitudinal groove.

The linkage element may be in the form of a flat member presenting on one of its edges equidistant notches, the distance separating two successive notches being equal to twice the length of a wall element.

The invention further includes a male cap in the form of a thin strip whose width is equal to the width of a wall element. The cap includes a longitudinal tongue extending throughout its length. The dimensions of the tongue are such that it enters in the grooves of the wall elements or the grooves of the framing elements.

The invention also includes a female cap of thin strip material whose width is greater than the width of the wall elements. This female cap includes a longitudinal groove extending throughout its length.

The roofing profile comprises two parts separated by a cutting or breaking line, one of said parts comprising equidistant notches opening on its free edge, the distance separating two successive notches being equal to twice the length of a wall element. The other part of the framing profile may comprise on one of its faces, grooves forming an angle of 15° for a low pitch roof or 45° for a low pitch roof with the free edge of this part and being able to be cut at right angles.

The invention also includes a finishing profile presenting in transverse cross section a general trapezoidal shape. One of the parallel faces of the finishing profile includes a longitudinal groove whereas the other face has a longitudinal tongue.

A roofing ridge profile is also provided which has a rounded upper surface and a lower surface having two longitudinal grooves extending along the sides of the profile and two longitudinal throats adjacent to each of said grooves but disposed between them.

The door-casing profile has a longitudinal tongue located on one edge thereof and two lateral grooves each opening on opposite sides of said profile and extending throughout its length.

The staircase profile has on one of its faces at the edge thereof a longitudinal groove and inclined grooves for receiving the steps of the staircase.

The invention also includes hinges comprising a securing plate including a bracket, a strap hinge having a groove for receiving the edge of a door or window, and a pin which fits into related openings in the securing plate and strap hinge.

The attached drawing shows schematically and by way of example, different elements of the invention and their relationship to each other when assembled to form certain constructions.

Figure 32:
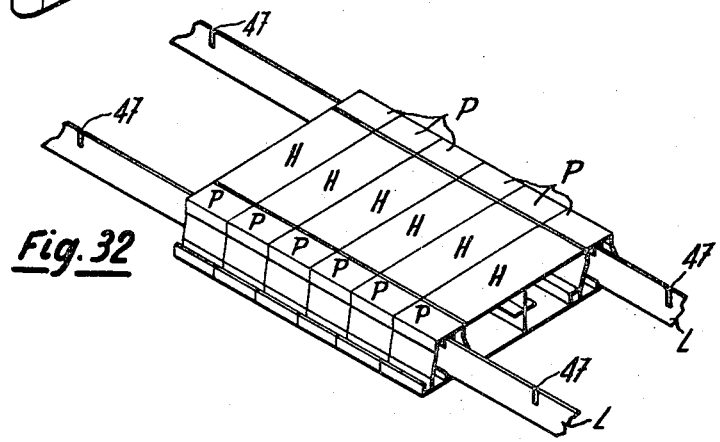
Figure 31:
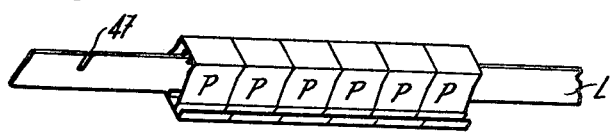
Figure 34:
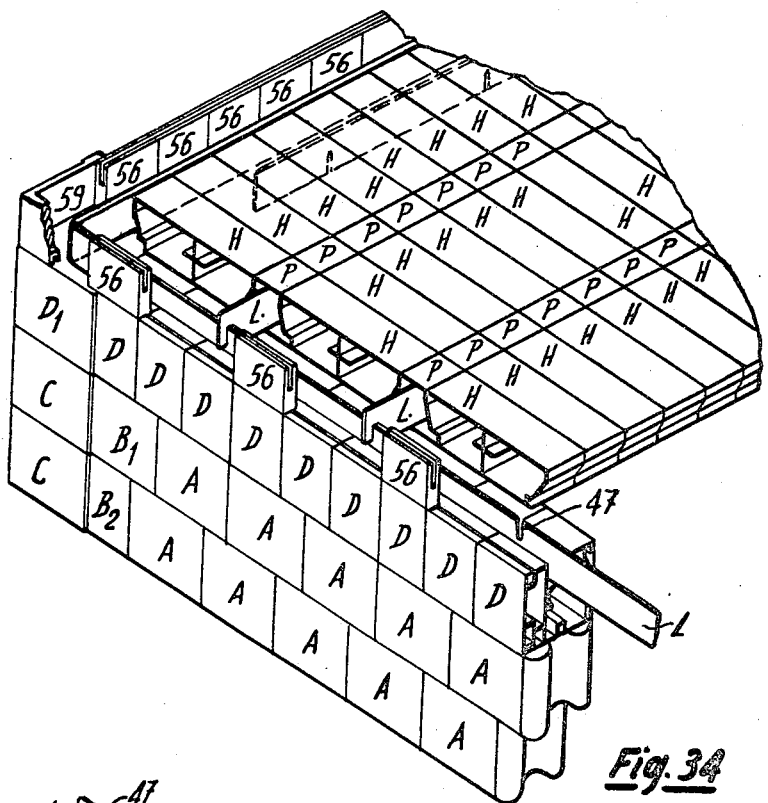
Figure 35:
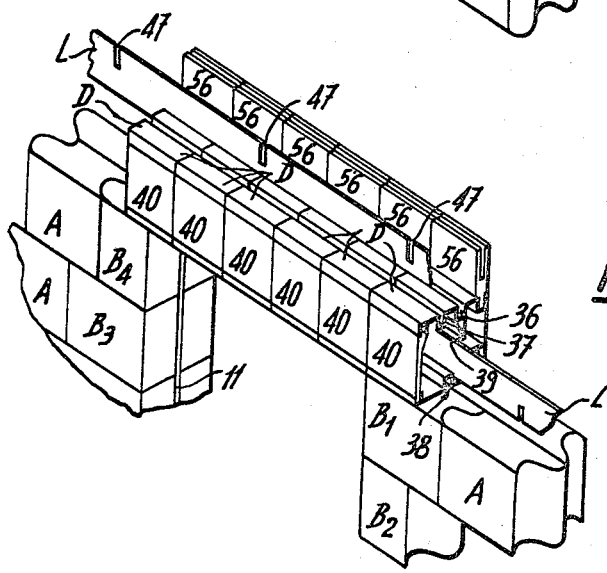
Figure 42:
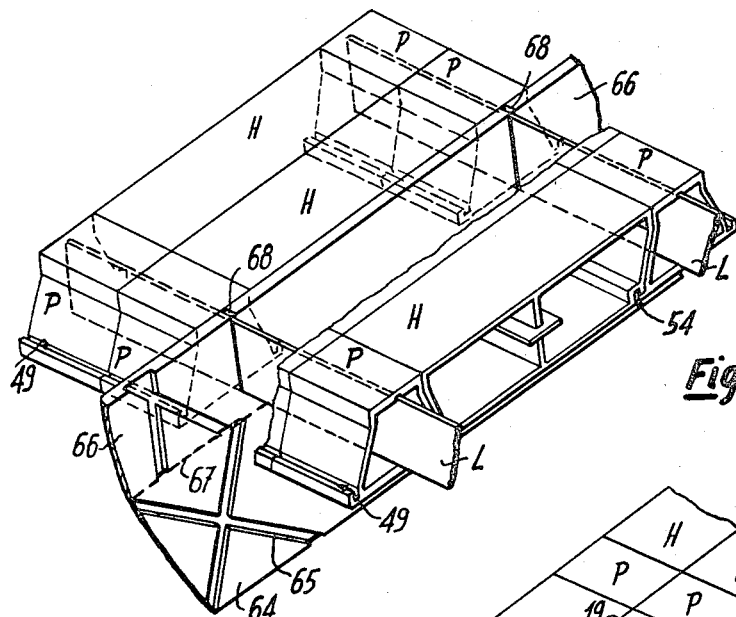
Figure 40:
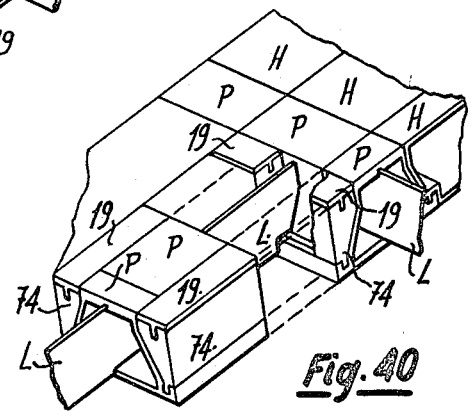
Figure 41:
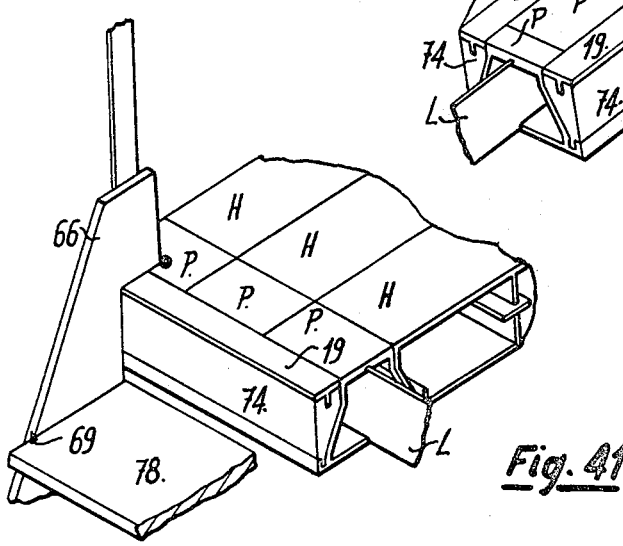
Figure 43:
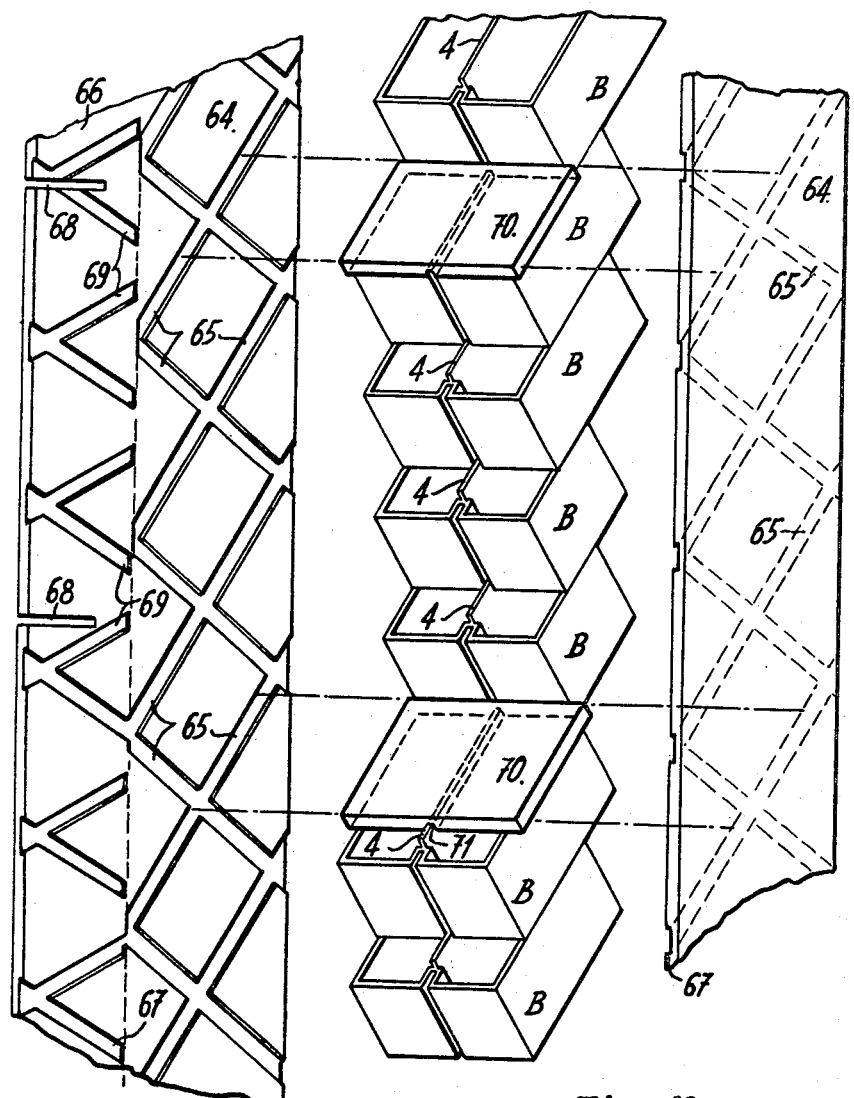
Figure 44:
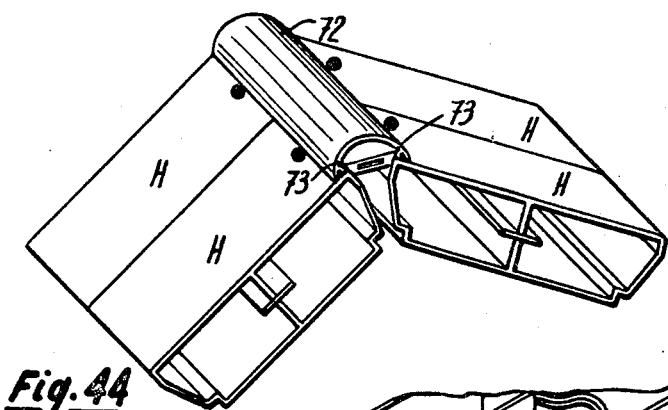
Figure 47:
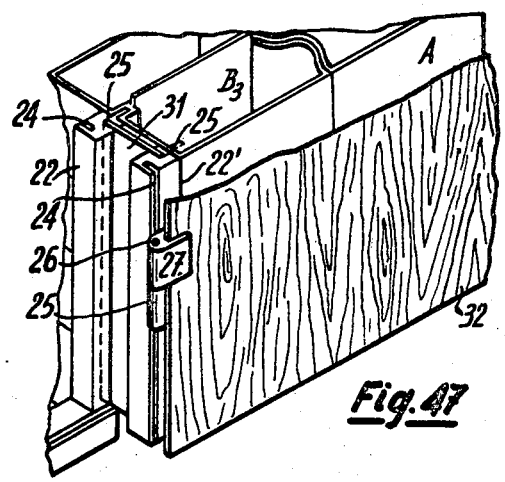
Figure 45:
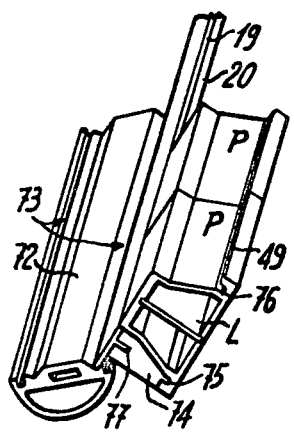
Figure 46:
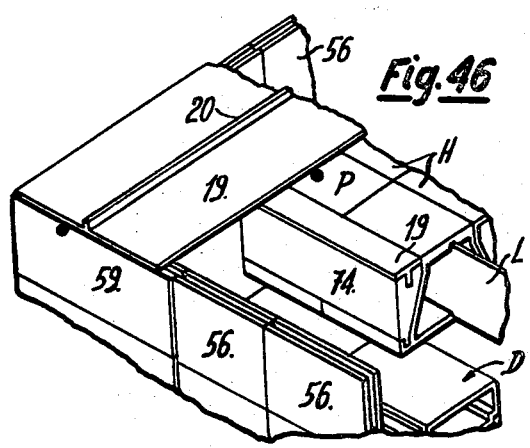
Figure 56:
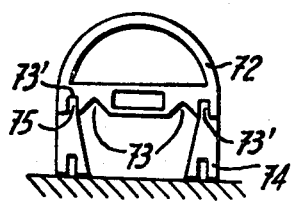
Figure 49:
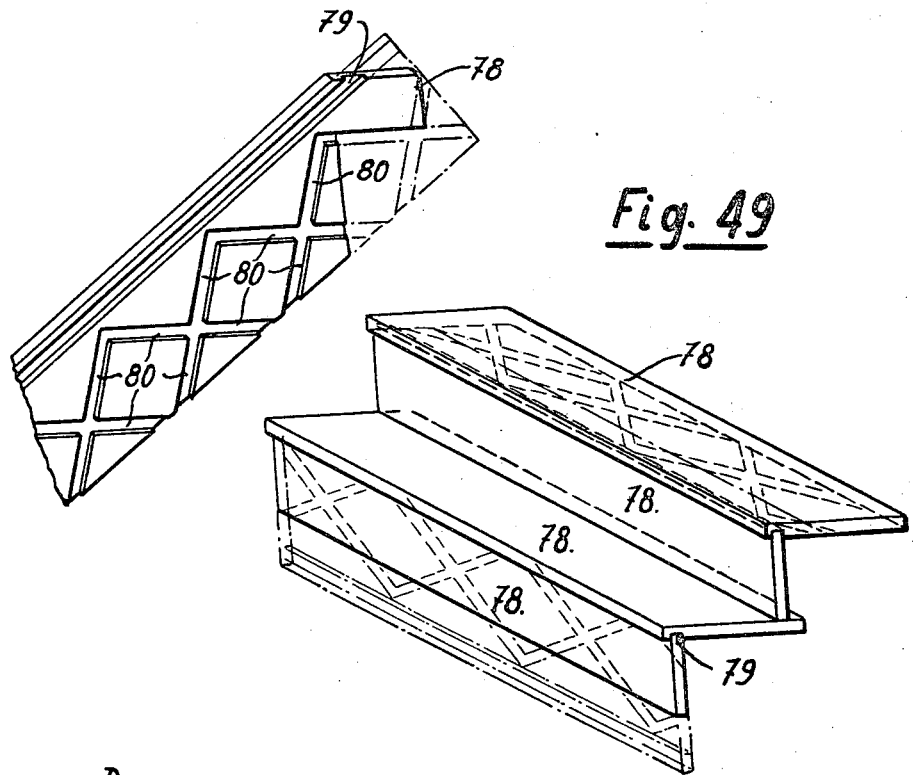
Figure 57:
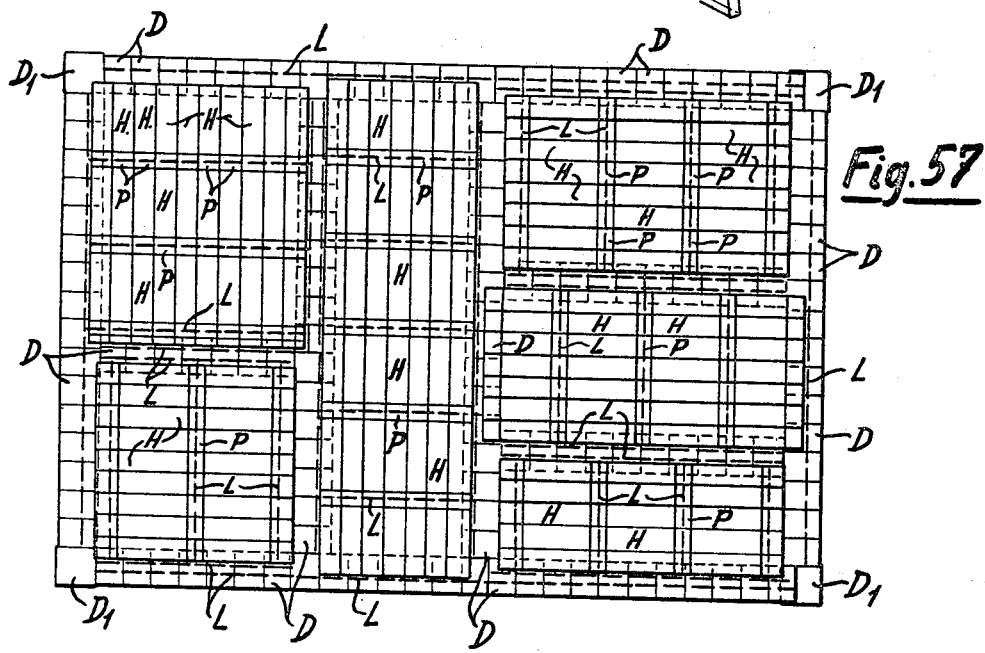
Figure 52:
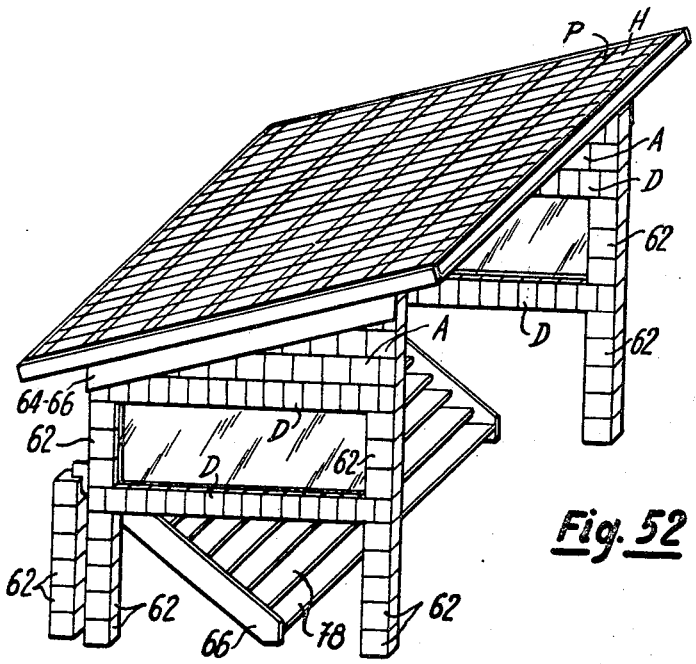
Figure 53:
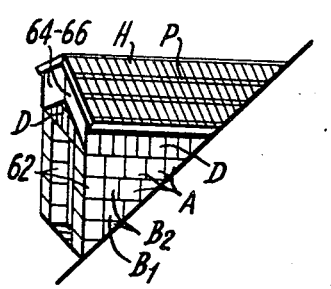
Figure 54:
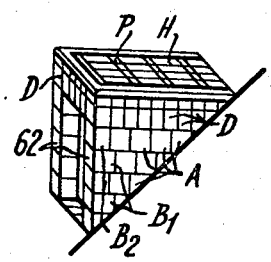
Figure 55:
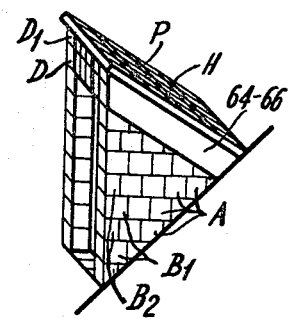

FIGURE 1 shows a standard wall element.
FIGURE 2 shows a large male framing element.
FIGURE 3 shows a small male framing element.
FIGURE 4 shows a large female framing element.
FIGURE 5 shows a small female framing element.
FIGURE 6 shows a corner block.
FIGURE 7 shows one embodiment of a beam block.
FIGURE 8 shows a bottom block.
FIGURE 9 shows a corner binding element.
FIGURE 10 shows a binding element.
FIGURE 11 shows a facing plate.
FIGURE 12 shows an acroterium element.
FIGURE 13 shows a ventilating element.
FIGURE 14 shows a post element.
FIGURE 15 shows the three parts of a hinge.
FIGURE 16 shows a door-framing element.
FIGURE 17 shows a male cap.
FIGURE 18 shows a roofing profile.
FIGURE 19 shows a female cap.
FIGURE 20 shows a finishing profile.
FIGURE 21 shows a linkage element.
FIGURE 22 shows a staircase profile.
FIGURE 23 shows an old framing profile.
FIGURE 24 shows a modern framing profile.
FIGURE 25 shows a part of a door framing.
FIGURE 26 shows a part of a wall and of a transverse wall.
FIGURE 27 shows a corner wall.
FIGURE 28 shows partially a wall provided with a window.
FIGURE 29 shows partially a wall provided with a door.
FIGURE 30 shows partially the framing of a window.
FIGURE 31 shows partially a beam.
FIGURE 32 shows partially a surface usch as a floor or roof.
FIGURE 33 shows partially the setting of beams on the walls.
FIGURE 34 shows partially a floor.
FIGURE 35 shows the mounting of a lintel.
FIGURE 36 shows the interconnection of the floor blocks.
FIGURE 37 shows the mounting of a hinge for a window, door or an outside shutter.
FIGURE 38 shows partially a construction having a flat roof.
FIGURE 39 shows a possible form of construction for a house.
FIGURE 40 shows a detail of the side of a passage.
FIGURE 41 shows the fixing of a ladder.
FIGURE 42 shows a detail of a roof.
FIGURE 43 shows the mounting of a roof support.
FIGURE 44 shows a detail of the ridge of a roof.
FIGURE 45 shows a detail of a gutter.
FIGURE 46 shows a detail of the start of the second floor of a construction.
FIGURE 47 shows in detail a window frame provided with a window shutter.
FIGURE 48 shows partially a construction comprising a staircase.
FIGURE 49 shows a detail of a staircase.
FIGURE 50 shows a second embodiment of beam block and of the erection of a surface such as a floor and roof.
FIGURE 51 shows partially the construction of a bridge.
FIGURE 52 shows schematically the construction of a grandstand.
FIGURES 53, 54 and 55 show schematically three embodiments of garret windows.
FIGURE 56 shows schematically the construction of a downspout.
FIGURE 57 shows a particular construction of floors.

This construction toy comprises different prefabricated elements of small dimensions intended to be assembled and juxtaposed to realize a desired construction. These constructions may be quite different such as dwelling houses, buildings, towers, shops, archways, shelters, show places, motels, farms, amphitheaters, bowling lanes, grandstands, swimming pools, rings, water towers, observatories, store pits, service stations, covered markets, railway stations, viaducts, tunnels, foot-bridges, bridges, cross-roads with several levels (car interchanges), garages, sheds, workshops, factories etc.

However, to simplify the description, this description will be limited to a dwelling house, the construction of which due to its complexity, enables illustration of most of the different particular mountings.

All the elements of the construction toy are made preferably in plastic material and are made for example by moulding, injection or extrusion according to their shape.

This construction toy comprises:

(1) Wall elements A (FIG. 1) the dressing faces 1 of which are rectangular, whereas its lower and upper faces 2 comprise respectively a fitting groove 3 and a fitting tongue 4. This groove and tongue have corresponding transverse cross sections and are located in the vertical plan of symmetry of the wall element A. The end faces of these elements, comprise throats 5, 6 and ribs 7, 8 of corresponding shapes, so that each element presents one female end and one male end having a double fitting. The shapes and the transverse cross sections of the tongues, the ribs, the throats and the grooves are formed so as to enable the fitting of the elements through simple juxtaposition of adjacent elements. These wall elements A are hollowed or provided with partitions so as to reduce the weight of plastic material used. In the embodiment shown the wall element A includes a thin partition located in the longitudinal plane of symmetry of the element, separating the hollow inside of the element in two chambers 9. The upper part of said partition merges out of the upper face of the wall element A and constitutes the said tongue 4. The lower part of this median wall has a greater thickness and is located in the lower face of the wall element A. The groove 3 is provided in said lower thicker part of the wall. Furthermore, these voids or chambers 9 communicate when the elements are assembled to form vertically extending channels disposed inside the walls of a construction.

(2) Female framing elements $B_1$, $B_2$ (FIGS. 4 and 5) and male framing elements $B_3$, $B_4$ (FIGS. 2 and 3). One of the end faces of the elements $B_1$, $B_2$ presents throats 5 and rib 7, whereas one of the end faces of the elements $B_3$, $B_4$ presents the throat 6 and the ribs 8. Thus these end faces register with the one or the other of the end faces of a wall element A, or the ones in the others. These framing elements are also hollowed and comprise chambers 10 opening on their opposite resting faces and are also separated by means of a vertical thin wall which is provided with the tongue 4 and with the groove 3 in a similar way to the wall elements. The length $a$ of the elements $B_1$ and $B_3$ is greater than the length $b$ of the elements $B_2$ and $B_4$ so as to enable a shifting of the vertical joints $j$ (FIGS. 26, 27) in a frontage. The second end face of the elements $B_1$, $B_2$, $B_3$, $B_4$ is smooth and presents a groove 11 intended to receive the posts or frames of the doors and windows (FIGS. 25, 28 and 29). This groove 11 is also provided in the median wall of the framing element, this wall comprising a thicker part in its portion adjacent to the said smooth end face.

(3) Corner blocks C comprising two dressing faces 12 forming an angle of 90° between them. These corner blocks C are also hollowed and present a thin central partition 13 carrying the tongue 4 and the groove 3 of the upper and lower resting faces in a way similar to the median wall of the wall elements A.

The dressing faces 12 comprise at their upper end, that is in the upper resting face of the corner block, a fitting tongue 14; and at their lower end, that is in the lower resting face of the corner block, a groove 15 intended to receive the tongue 14 of an adjacent corner block. These tongues 14 and grooves 15 provide reinforcement for the assembly of the corner blocks and thus provide a stronger construction.

The faces 16 opposite the dressing faces 12 of a corner block include a tongue 17 extending vertically and intended to cooperate with the groove 11 of the framing elements. Furthermore, the dressing faces 12 extend laterally to form an overlap 18 covering partially a framing element assembled to the corner block.

(4) A male cap 19 (FIG. 17) presenting the shape of a strip or plate of a width equal to the width of one of the wall elements A, framing elements B and posts 62 but of less thickness will be described in detail later on. The length of these strips can be of any dimension. This male cap is intended to be cut in portions the length of which is determined by the dimensions of the object being constructed.

This male cap 19 comprises a longitudinal tongue 20 extending throughout its length. This tongue 20 is intended to cooperate with the groove 3 of the wall elements A, the framing elements B, the corner blocks C and the posts 62. This male cap 19 is particularly intended to be laid or fixed on a surface and to serve as a basis or foundation for a particular construction.

In fact, in order to erect a wall for example (FIG. 27), a section of male cap 19 is placed on a plane surface, the length of said section corresponding to the length of the wall to be built. Then a small female framing element $B_2$ is placed at one end of said male cap section 19. This framing element $B_2$ is fixed on said male cap 19 by the fitting of the tongue 20 of the cap in the groove 4 of the framing element $B_2$. Then a first row of wall elements A is set in place, each wall element being fixed on the male cap 19 by means of the fitting of the tongue 20 in the groove 4 of this wall element A. Furthermore these wall elements A are assembled the one to the other through engagement of the ribs 7, 8 in the throats 5, 6 of the adjacent wall elements. At last, this first row of the wall is terminated by a large male framing element $B_3$.

As the length $a$ of the large male and female framing elements $B_3$, $B_1$ is equal to the length of a wall element A and the length $b$ of the small male and female framing elements $B_4$, $B_2$ is equal to two thirds of the length of a wall element A; the length of a wall is always equal to a multiple of the length of a wall element A increased by two thirds of the length of one of these wall elements. A second row of elements is then placed on the first one, starting with a larger female framing element $B_1$ and ending with a small male framing element $B_4$ so that the vertical joints $j$ between two adjacent wall elements A are staggered from one row to the next.

All of the elements $B_1$, A and $B_4$ of this second row are assembled together by means of the throats 5, 6 and of the ribs 7, 8 and are mounted on the elements $B_2$, A and $B_3$ of the lower row by means of the tongue 4 of the elements of the lower row entering the grooves 3 of the elements of the upper row. The wall is thus built by steps to the desired height. Such a wall portion constitutes the simplest element of a construction according to the invention.

It is evident that the corner blocks C may be laid at the end of the wall thus constructed. A corner block C will be fixed on the male cap 19 by means of its groove 3 fitted on the longitudinal tongue 20 of the male cap. This element will be further fixed to the large male framing element $B_3$ by insertion of its vertical tongue 17 in the groove 11 of the element $B_3$. Corner blocks C are thus fitted one in the other and with the corresponding framing elements of the wall to a height equal to the height of the wall.

Using the same assembling rules it is possible, through simple stacking and juxtaposition of wall elements A, framing elements B and corner blocks C, to construct walls (FIG. 27) and partitions (FIG. 26) of any construction.

It is evident that openings, doors and windows (FIGS. 28 to 30) can be provided in the walls of a construction by using framing elements B. The dimensions of these openings are automatically determined by the dimensions of the said wall element A and framing B elements. The width of these openings is always equal to a multiple of the length of a wall element A increased by one-third of the length of a wall element A.

Window-sill elements F are provided (FIGS. 28 and 30) and comprise a groove 3 intended to be fitted on the tongues 4 of the wall elements of the row of the wall lining the lower side of the opening intended to receive a window. These window-sill elements F have a width $c$ equal to one third of the length of the wall elements A so that the width of an opening may always be completely filled without clearance by means of these juxtaposed elements F. These window-sills F have further an upper groove 21 located in the same vertical plane as the grooves 3. The groove 21 is intended to receive the posts or frames of the windows.

The upper side of the openings forms a lintel (FIG. 35) and is formed by the assembly of binding elements D which will be described later on.

The frames of the openings, doors and windows, are obtained by means of a framing profile 22 (FIG. 16). This framing profile 22 comprises a longitudinal tongue 23 located in the longitudinal plane of symmetry of the profile and extending throughout its length. Further, this profile includes two lateral grooves 24, 25 each opening on opposite sides of said profile and also extending throughout its length. This framing thus presents in transversal cross section, in its portion forming the two grooves 24 and 25, the general shape of an S.

The shape and the dimensions of the longitudinal tongue 23 of the framing profile 22 are such that they may fit in the groove 11 of the framing elements B and posts 62, the groove 21 of the window-sills F and the groove 3 of the wall elements A, the framing elements B and the binding elements D.

This framing profile 22 is cut in sections the length of which corresponds to the dimensions of an opening, particularly to its height. These framing profile sections are then fixed through engagement of the tongue 23 in the groove 11 of the framing elements lining the opening. The upper and lower sides of the opening can be also provided with a section of framing element in a similar way.

FIG. 15 shows the three parts of a hinge intended for securing the edges of a window or a door on the sections of framing profile 22. This hinge comprises a securing plate 25' and a pin 26 as well as a strap-hinge 27. The securing plate 25' includes a bracket 28 intended to be driven in one or the other of the grooves 24, 25 of the framing profile 22. This securing plate 25' comprises further a blind hole in which the shaft 26 is partly located. The strap-hinge 27 includes a hole intended to receive the pin 26 and a slot 29 intended to receive the edges of a door or of a window formed by a plate of plastic material 30 cut to the desired dimensions.

FIG. 37 shows the assembling of such a hinge. In this way it is possible to construct movable doors and windows which is very important for the enjoyment of the toy.

Furthermore FIG. 47 shows a modification in which a window is provided with a shutter 32. In fact the groove 25 of the framing profile 22, fitted in the framing elements B, receives an edge 31, of a male cap 19. A section of framing profile 22 is secured on said edge 31 through engagement of said edge into a groove 25 of a second framing profile 22'. The first framing profile 22 carries, in the above described way, the edge of a window whereas the second framing profile 22' carries in a similar way the edge of a shutter 32.

It is evident that in non-illustrated modifications a one pane window may be realized, or on the contrary a bay window or glass partition presenting several window panes can be realized. The same is true for the outside closures such as multiple shutters etc. In fact by means of the hinge illustrated at FIG. 15 it is possible to hinge on a first pane, the external edge of which is fitted in one of the grooves of a framing profile, a second pane. Furthermore it is also possible to construct fixed windows, which do not open, by fitting the edges of a piece of sheet of plastic material cut to the dimensions of the opening directly in the grooves 11 of the framing elements.

The doors are assembled in a way similar to the windows and many kind of combinations are obtainable for the outside framework as well as for the inside framework. The plates of plastic material forming the doors and the shutters are rendered opaque, for example by covering them with adhesive paper.

It is to be noted further that heights of the fall elements A, framing elements $B_1$, $B_2$, $B_3$, $B_4$ and corner blocks C are identical among one another. On the contrary, it is possible to provide the wall elements A and the framing elements B of less width (thickness of a wall), these thinner elements being used for the construction of internal partitions or light constructions whereas the standard elements, having a larger width, are used for the construction of the load bearing outer and inner walls.

The elements so far described and their assembling, are new and original and enable one to construct elements or parts of a construction at reduced scale corresponding very closely to actual constructions, do not constitute the essential feature of the present invention. In fact the essential feature of the invention is the realization at a reduced scale of different floors and roofs exactly representing actual constructions. This, to the knowledge of the inventor, has never been realized up to now and was not conceivable up to this day with prefabricated elements.

For the construction of floors and flat roofs, the present construction toy comprises further the following prefabricated elements:

(5) Binding elements D (FIG. 10) the height of which is, in the embodiment shown, identical to the height of the wall elements and the length of which is equal to the length of a small framing element $B_2$, $B_4$, that is to say to two thirds of the length of a wall element A.

These binding elements D present a dressing face 33 intended to be located in the plane of the frontal or dressing plane of a wall on which these binding elements are assembled. The lower resting face of a binding element is provided with a groove 3 intended to cooperate with the tongues 4 of the wall elements A of the upper row of a wall section.

These binding elements D do not comprise lateral anchoring means but are simply placed side by side, each being fixed through its groove 3 on the tongue 4 of one of the wall elements A of the upper row of a wall section.

The upper face 34 of the binding elements D have three parallel throats 35, 36 and 37 extending on the whole length parallel to the dressing face 33. These binding elements are also hollow and present a slide parallel to the dressing face 33, formed by a groove 38 and an abutment 39. Further the binding element D is open on its rear face, opposite its dressing face 33. However it may be closed by means of a closure plate 40 comprising at its upper end a tongue 41 intended to be entered in a groove 42 provided in the upper surface 34 of the binding element D but opening in its inside.

The lower end of this closure plate 40 is intended to come in contact with a bearing face 43 of the element D.

Due to the dimensions of the binding elements D it is always possible to obtain by their juxtaposition, a length equal to an even multiple of the length of a wall element A increased by the two thirds of the length of such a wall element A.

In cases where a binding has to be assembled on a wall section the length of which is equal to an odd multiple of the length of a wall element A increased by the two thirds of the length of such a wall element, the binding obtained by the juxtaposition of binding elements D is equal to the length of the wall section increased by one third of the length of a wall element. The binding elements located on the ends each merge thus of one sixth of the length of a wall element inside a corresponding corner binding element $D_1$ described hereinafter.

(6) Corner binding elements $D_1$ (FIG. 9) present in transverse cross section the general form of an angle and comprise in the lower resting faces a groove 44 intended to cooperate with a tongue 12 of the corner blocks C. Each element $D_1$ is also provided with a tongue 45 in its upper resting face. The lateral parts 46 of corner binding element $D_1$ are of less thickness and their internal face is located in alignment with the dressing face of a wall section. In this way the lateral parts may cover the binding elements D when they overlap the corner blocks C.

(7) Linkage elements L (FIG. 21) are constituted by a profile the width and the length of which are such that they fit frictionally in the slide (38, 39) of the binding elements D. This profile L is provided with equally spaced notches 47 opening on one of its edges. The distance separating two of these adjacent notches 47 is equal to twice the length of a wall element A. The thickness of this profile corresponds to the width of the grooves 36, 37, 38 and 3 provided in the different already described elements.

To construct a lintel (FIG. 35), binding elements D are engaged on a linkage element L, the number of these binding elements D disposed side by side being sufficient to form a length of the lintel which is greater than the width of the opening which is to be covered. The binding elements D forming the ends of the lintel are then fixed on the framing elements B, on the wall elements A or on the posts 62 adjacent to the opening by the fitting of the tongues 4 of elements B, A, and 62 in the groove 3 of the binding elements D. The linkage element L is fitted in the slide (38, 39) and maintains the binding elements aligned one with the other despite the fact that they do not have any lateral anchoring means.

(8) Beam blocks P (FIG. 7) present in transverse cross section a general trapezoidal shape. These beam blocks are hollow and comprise a slide formed by two grooves 48 provided in the upper and lower walls of the beam block and opening inside said block. These grooves 48 are placed on a longitudinal symmetrical plane of said blocks and are intended to receive the edges of a linkage element L when said beam blocks P are engaged thereon (FIG. 31). Further these beam blocks comprise two rest faces 49 extending parallel to its longitudinal axis, that is to the grooves 48. The beam blocks P also include upper 50 and lower 51 faces which are planar and parallel one to the other. The length of a beam block is approximately equal to one half of the length of a wall element A.

(9) Floor blocks H (FIG. 8) the upper 52 and lower 53 faces of which are also plane and which are of a height identical to the height of the beam blocks P. The floor blocks H present further rest surfaces 54 intended to rest on the rest faces 49 of beam blocks P being part of adjacent parallel beams. Furthermore the shape of these floor blocks H is such that when they rest between two adjacent parallel beams the upper surfaces 50, 52 and lower surfaces 51, 53 of the juxtaposed beam blocks and of the floor blocks are located in the same planes and form the upper and lower plane surfaces of a floor without any discontinuity (FIG. 32).

The floor blocks H are hollow and include chambers separated by means of a thin median partition 55. Securing means are disposed in the front faces of the floor blocks and are constituted in the embodiment shown by a groove and a tongue fixed on the said partition 55 and disposed each in one of the frontal faces of the floor block. Each of these tongues is intended to cooperate with the groove of an adjacent floor block for their fixation (FIG. 36). The length formed by the juxtaposition of a beam block P and of a floor block H is equal to twice the length of a wall element A in the example shown.

To construct a floor (FIG. 34) or a flat roof (FIG. 38) a support is formed which is formed by the juxtaposition of binding elements D held together by means of a linkage element L the full edge of which, the one which does not include the notches 47, is fitted in one of the grooves 36 or 37 of the upper face 34 of the binding element D. The length of this support, determined by the number of juxtaposed binding elements D, corresponds to the length of a wall section or element of the construction on which it has to be fixed.

The support thus constructed is then fixed on the upper row of framing elements B and of wall elements A of a wall section through engagement of the tongue 4 of the elements A, B into the groove 3 of the binding elements D. A second support is then formed in a similar way which is fixed on a wall section opposite the preceding one, between which a floor or a flat roof is to be built.

Beams (FIG. 31) are then built, the length of which corresponds at least to the distance separating the two aforementioned opposite walls, by engaging a corresponding number of beam blocks P on a linkage element L which is cut to the desired length. The length of the linkage element is greater than the length of the beam so that its ends merge out of the beam blocks P forming the two ends of the beam. The free ends of this linkage element L are then fitted in the notches 47 in alignment with the linkage elements being part of the supports fixed on the opposite walls. There is thus (FIG. 33) a number of parallel beams equal in number to the number of notches 47 of each of the supports. At last (FIGS. 34, 38) floor blocks are disposed between the laid beams, in equal number to the number of elements of each of said beams. In that way a floor or a flat roof is formed by closing the space situated between the two opposite walls.

In the case of a construction comprising 4 walls, one floor or one flat roof is built in the same way as previously described. Furthermore the walls which do not bear the floor (beams) are also provided with binding elements D and if necessary a further row of floor blocks H is laid on the free rest faces 49 of the outside beams and the upper surface 34 of the binding elements D of the said non-bearing walls.

To strengthen the construction, a linkage element L is inserted in one of the grooves 36, 37 of the binding elements fixed on the non-bearing walls of the floor. This linkage element permits connecting and fixing the binding elements D one to the other and eventually fixing the position of the external row of floor blocks H bearing on the binding elements.

To mask the construction of the floor or of the flat roof, dressing plates 56 (FIG. 11) are provided which have a tongue 57 and a slot 58. These dressing plates 56 present a length equal to the length of the binding elements D and are intended to be fixed thereon by the insertion of the tongue 57 in the groove 35 of said binding elements D. The height of these dressing plates 56 is such that the upper edge, provided with the slot 58, when fixed on a binding element D, is located in the same plane as the upper surface of the floor.

Corner dressing plates 59 (FIG. 33) are similar to the corner binding elements $D_1$ (FIG. 9) but their height is reduced and is equal to the one of the dressing plates 56 (FIG. 11). These corner dressing plates 59 are intended to be fixed on a corner binding element $D_1$.

To realize a multi-floor construction (FIGS. 39, 46) sections of male cap 19 are fixed, by gluing for example, on the upper surfaces of the dressing plates 56, the corner dressing plates 59 and the floor. These sections of male cap 19 are disposed along the walls having to be built further in height. On these caps a new floor is built in a way similar to what has been already described.

In the case of a flat or terrace roof the finishing is achieved by acroterium elements 60 (FIGS. 12 and 38) comprising a tongue 61 intended to be fitted in the slot 58 of the dressing plates 56. Sections of male cap 19 may also be mounted as described in the preceding paragraph.

(10) Post elements 62 (FIGS. 14, 38) present a transverse cross section having a square shape and present on their upper and lower rest faces a tongue 4 and a groove 3 respectively. Two opposite partitions show grooves 11 similar to the ones of the framing elements B. These post elements 62 permit forming pillars or columns, for example (FIG. 52) and constructions with or without a wall filling. These pillars may also form chimneys (FIG. 38).

Ventilating elements 63 (FIGS. 13, 38) have a transverse cross section of generally rectangular shape and present smooth faces. These elements comprise also a tongue 4 and a groove 3 disposed in their upper and lower rest faces. These elements enable construction of different portions of a building such as chimneys, etc.

The groove 3 and the tongue 4 of the post elements 62 and of the ventilating elements 63 are also carried by a median partition of these elements in a similar way to the wall elements A and the framing elements B.

For the construction of old roofing (inclined at 45°) or modern roofing (inclined at 15°) (FIGS. 39, 42 to 45) the construction game includes the following additional elements:

(11) An old roofing profile (FIG. 23) comprising two parts, a first part 64 one face of which is provided with grooves 65 extending from one edge to the other of said part 64 and forming an angle of 45° with the edges of said part 64. These grooves 65 intersect at right angles. A second part 66 of this profile, separated from the first part by a cutting line 67, comprises notches 68 opening on its free edge. These notches are equally spaced and separated by a distance equal to twice the length of a wall element A.

The second part 66 further includes grooves 69 extending throughout the length thereof.

(12) A modern roofing profile (FIG. 24) is similar to the old roofing profile, but the grooves 65 form an angle of 15° with the edges of the first part 64 of profile.

(13) A female cap 70 (FIG. 19) has a longitudinal median groove 71. The thickness of this female cap 70 corresponds to the width of the grooves 65 of the old and modern roofing profile and may be driven into them. The width of this female cap 70 is greater than the width of the wall elements A and the framing element B in an amount equal to twice the deepness of the groove 65 of the roofing profiles.

To construct an old or modern roof a gable wall is built (FIGS. 39 and 43) the general slope of which is for example equal to 45° or 15° according to the type of roof desired. Then a support is built which comprises a section of old or modern roofing profile the ends of which have been cut at 45° or 15° and the length of which corresponds to the one of the part of roof to be constructed. This section of profile is provided with two portions of a female cap 70 which are fixed on the roofing profile. The sections of the female cap 70 are fitted through their edges in certain of the grooves 65 of the roofing profile, the groove 71 of the female cap being directed downwardly when the roofing profile is maintained in working position, that is at 45° or at 15°. A second old or modern roofing profile is cut along the cutting line 67 and the first part of this profile is cut at 45° or 15° at its ends and is of a length identical to the length of the first profile used, and is fixed on the free edge of the female cap 70 fixed on the roofing profile. The above mentioned support thus comprises a roofing profile 64, 66 and the first part 64 of a roofing profile disposed parallel one with respect to the other and connected together by means of sections of female caps 70 the edges of which are fitted in the grooves 65 of the first part 64 of the roofing profiles.

This support is then fixed on the gable wall and covers it while providing the appearance of a roof. In fact the roofing profile 64, 66 and the first part 64 of the other roofing profile cover the outer and inner faces respectively of the gable wall to mask its stairway shape. The securing of this support on the gable wall is obtained by the laying of sections of a female cap 70 on some of the upper framing elements B of the gable wall, that is the ones forming the staircases of the gable wall. The tongue 4 of the framing elements B is driven in the groove 71 of the sections of female caps 70 and thus secures the support to the gable wall.

It is evident that in some cases the support could not comprise the first part of the second roofing profile, which is only provided for the esthetic finishing of the construction in masking the staircases of the inner face of the gable wall.

The inclined surface of the roof (FIGS. 39 and 43) is accomplished in an identical way as the horizontal surface of a floor. Beams, formed by beam blocks P driven on linkage elements L, are secured to the supports which are secured to opposite gable walls through engagement of the linkage elements L in the notches 68 of the roofing profile of the support. The spaces between two adjacent parallel beams are filled by the fitting of bottom blocks exactly as in the construction of floors.

The ridge of the roof is constructed by the upper last row of bottom blocks of each roof face, the bottom blocks H of these two rows rest one against the other. To obtain a perfect finish of the ridge of a roof (FIG. 44) a ridge profile 72 is provided (FIG. 18) presenting a curved upper face and a lower face provided with two throats 73. A section of this ridge profile 72 is laid on the ridge of the roof and its two throats 73 rest on the upper edges of the bottom blocks of the upper rows of each face of the roof.

The lower end of a roof face is always terminated by a beam formed of beam blocks P driven on a linkage element L. However, to improve the finishing of the lower end of the roof (FIG. 45) a finishing profile 74 (FIG. 20) is applied by engagement of its tongue 75 in a groove 76 separating each rest face 49 of the body of said beam blocks P. The finishing profile 74 has a shape such that when secured to beam blocks P it fills in the area locking in the beam block P necessary to provide a rectangular shape when seen in cross section. A floor or roof surface can thus, by means of this finishing profile, be terminated properly (FIGS. 45, 46, 41, 40).

The finishing profile 74 is also provided with a groove 77 on its upper face intended to cooperate with the longitudinal tongue 20 of the male cap 19.

To attach a gutter (FIG. 45) at the lower end of a roof surface, a section of a male cap 19, one edge of which has been reduced for example by cutting, is secured to the finishing profile by engagement of the tongue 20 in the groove 77. Then the free edge of the male cap 19 is placed in one of the throats 73 of the ridge profile 72 and fixed therein by gluing for example. On the other side, with the combination of a ridge profile 72 with two finishing profiles 74, a rain water downspout (FIG. 56) is realized by engagement of the tongue 75 of the finishing profile 74 in one groove 73' (FIG. 18) of the ridge profile 72. The downspout is fixed on the wall by gluing for example.

In some cases openings or tunnels have to be provided FIGURES 39 and 40 show the provision for an opening plae for the construction of stairs or chimneys, roof windows, etc. The finishing of the edge of these openings is accomplished in the manner shown in FIG. 39. Two sides of the opening are formed by placing a section of a finishing profile 74 along a beam in a manner already described. The two other sides of the opening are formed by means of standard rectangular beams, the two sides thereof having been provided with a finishing profile 74. These beams rest on the beam blocks P limiting the opening in the direction perpendicular to said rectangular beam. The beams which have to be cut for forming the opening, rest through one of their ends on said rectangular beam. To obtain a smooth upper surface, sections of a male cap 19 are fixed on all the sections of finishing profile 74.

FIGURES 39 and 40 show the provision for an opening for a staircase. The sides of the staircase are formed by sections of the second part 66 of a roofing profile the lower end of which is cut so as to rest on a surface whereas the upper end thereof is cut as shown in FIG. 41 to grip on the side of an opening. The steps of this ladder are constituted by sections of a staircase profile (FIG. 22) the edges of which are driven in the grooves 69 of the sides of the ladder which are formed by sections of second part 66 of a roofing profile.

This staircase profile 78 comprises a smooth surface, forming the upper side of the steps, and a surface provided with a longitudinal groove 79 on the one hand, and with angularly disposed grooves 80 intended to receive the steps of the staircase on the right and left side on the other hand.

FIGURE 48 shows partially a construction comprising a staircase. This staircase comprises a landing constituted by sections of staircase profile 78 resting on wall portions. Each staircase is formed by means of the staircase profile 78. The sides are formed by means of sections of the said profile 78 the ends of which are cut to shape so as to rest on the landing on the one hand and on a floor on the other hand. FIGURE 49 shows in detail the construction of the staircase. The steps are constructed by sections of the staircase profile 78 the ends of which are driven in the grooves 80 of the sides. The risers are formed by means of sections of the said staircase profile 78 the width of which has been reduced. These pieces are driven by their upper edge in the throat 79 of the upper step whereas their lower edge rests on the lower step.

It is not possible to describe here all the particular possible assemblies which may be realized with the above described construction elements, the number of these assemblies being too high. So with the elements and profiles described, various components of a structure can be made, for example overhanging roofs (with respect to the gable walls) with old roofing (FIG. 42) and modern roofing, the outside stairs 81 (FIG. 39) with or without perron, handrails 82 (FIG. 48), wardrobes 83 (FIG. 39), cupboards under the sanitary equipment, channels on the flat roofs, chimney caps 84 (FIG. 39), joints of floors and roofs 85 (FIG. 39), facings 86 (FIG. 48) etc. However the preceding gives an indication on what may be made from the elements comprising the invention.

It is evident that the shape and the dimensions of the elements could be modified as long as their assembling in the manner described is possible. Particularly FIG. 50 shows another form of surface. This surface, floor or roof, is formed by means of beam blocks P' driven on linkage elements. These beam blocks P' present a rectangular transverse cross section and their length is equal to twice the length of the wall elements A. They are also provided with a slide defined by grooves 48. Such a floor or roof construction does not use floor blocks.

It goes without saying that the beams of a floor can be placed without prejudice along directions perpendicular and parallel between themselves (FIG. 57). The binding elements D are disposed on the inner walls corresponding to the different directions of the floors, and the linkage elements L, introduced in the grooves 36, 37 of the binding elements, receive the linkage elements L of the beams of the floors. On the other hand, it is possible, as illustrated in FIG. 39 to have a floor overhang outside a construction to form a balcony 87.

It is evident that very different constructions can be realized as shown in FIG. 39 illustrating a house, 51 representing a vehicle bridge, or 52 representing a stadium grandstand. All these constructions, given as examples only, are always constructed by means of the same elements. previously described.

Finally, in a roof with old or modern roofing it is possible to provide for different garret windows shown in FIGS. 53 to 55. In such a construction it is possible to associate parts of a roof with old roofing together with parts of a roof having a modern roofing.

It is evident that for the construction of models and toys which are still further modified one may use the channels provided inside the walls, the bindings and the floors to lay electrical wires and provide a lighting installation, or to provide a sanitary installation, a plumbing installation, or a central heating installation 88 (FIG. 39). To this end, some of the binding elements D (FIG. 10) are provided with openings 43' for the passage of the wires and ducts. Due to these pierced binding elements, the hollows or channels provided vertically in the walls, horizontally inside the bindings and the floors interact orthogonally. It is thus possible to dispose wires and ducts in all parts of the construction.

I claim:

1. A construction toy comprising in combination, a set of prefabricated building elements adapted to be assembled to form a structure, said building elements comprising diverse structural means including wall elements (A), framing elements (B1, B2, B3, B4), corner block elements (C), post elements (62), beam block elements (P), binding elements (D), floor elements (H), and rigid linkage elements (L), each of said elements including connecting means for assembly with a related element, a plurality of said juxtaposed binding elements (D) connected to each other by one of said linkage elements (L) to provide a support member, said beam blocks (P) slidably attached to another of said rigid linkage elements (L), and the ends of said last mentioned linkage elements (L) secured to opposite pairs of said support members located on opposite parts of a structure built from the said building elements.

2. A construction toy according to claim 1 including second support members for constructing a roofing profile, said support members comprising a plurality of flat elongated strip members having diagonally disposed intersecting grooves therein, a plurality of female cap members the edges of which are fitted into related ones of said grooves in oppositely disposed strip members.

3. A construction toy as claimed in claim 1, in which said beam block elements are slid on adjacent parallel ones of said linkage elements and are joined together to form a plane surface.

4. A construction toy as claimed in claim 1, wherein said floor elements are supported on said beam block elements slid on said adjacent parallel linkage elements to form a plane surface.

5. A construction toy as claimed in claim 1, wherein said connecting means of said wall elements include end faces each having throats and ribs of corresponding shape, to provide a male end and a female end.

6. A construction toy as claimed in claim 5, in which said connecting means of the wall elements further include a thin median partition whose upper end extends beyond the upper face of said element and defines a tongue, and the lower end of said element includes a thicker portion having a groove therein.

7. A construction toy as claimed in claim 1, wherein said framing elements connecting means includes throats and ribs at one end and the other end is a plane surface having a vertical groove therein.

8. A construction toy as claimed in claim 7, wherein said framing elements connecting means include a thin median partition whose upper end extends beyond the upper face of said framing element and defines a tongue, and the lower end of said framing element includes a thicker portion having a groove therein.

9. A construction toy as claimed in claim 8, wherein said framing elements include a large element whose length is equal to the length of one of said wall elements, and further include a small element whose length is equal to two-thirds of the length of one of said wall elements.

10. A construction toy as claimed in claim 7, wherein said corner block elements include two dressing faces disposed at right angles to each other, the lateral edges of said dressing faces providing an overlap, the connecting means of said corner block elements comprising, at the sides opposite said dressing faces, a vertical tongue adapted to enter in the vertical groove of the framing elements.

11. A construction toy as claimed in claim 1, wherein said post elements are of generally square shape in cross section and two opposite sides thereof are each provided with a vertical groove as a part of said connecting means.

12. A construction toy as claimed in claim 1, wherein said binding elements include a smooth dressing face, a lower surface, said binding element connecting means including an upper surface provided with upwardly and downwardly facing grooves extending parallel to the dressing face and a slide disposed inside said binding element, said slide defined by a groove in the lower surface and an abutment disposed above said groove, said slide adapted to receive a linkage element.

13. A construction toy as claimed in claim 12, wherein the binding element includes a removable rear face plate having a tongue at its upper end adapted to enter in a downwardly facing groove provided in the upper surface of the binding element, the lower end of said plate engaging a bearing surface in the lower wall of said binding element.

14. A construction toy as claimed in claim 1, in which the beam block elements are hollow and their connecting means include a slide adapted to receive a linkage element, said slide comprising two grooves, one in the upper wall and one in the lower wall of said element and each facing inwardly, said two grooves extending longitudinally of the beam block element.

15. A construction toy as claimed in claim 14, in which the beam block elements are of generally trapezoidal shape in cross section and their length is equal to one-half the length of a wall element, said beam block elements including upper and lower planar parallel faces and support surfaces extending outwardly from said lower face and parallel to the longitudinal axis of said beam block elements.

References Cited

UNITED STATES PATENTS

| 707,446 | 8/1902 | Nentwig | 46—19 |
| 2,388,297 | 11/1945 | Slaughter | 46—19 |

FOREIGN PATENTS

| 132,550 | 5/1949 | Australia. |
| 913,806 | 6/1946 | France. |
| 958,428 | 9/1949 | France. |
| 1,188,035 | 3/1959 | France. |
| 825,668 | 12/1951 | Germany. |
| 564,631 | 10/1944 | Great Britain. |
| 412,813 | 2/1946 | Italy. |
| 448,719 | 5/1949 | Italy. |
| 459,123 | 8/1950 | Italy. |
| 483,085 | 7/1953 | Italy. |

F. BARRY SHAY, *Primary Examiner.*